US012296453B2

(12) United States Patent
Moore

(10) Patent No.: US 12,296,453 B2
(45) Date of Patent: May 13, 2025

(54) HAMMER PISTON

(71) Applicant: Caterpillar Inc., Peoria, IL (US)

(72) Inventor: Cody Moore, Robinson, TX (US)

(73) Assignee: Caterpillar Inc., Peoria, IL (US)

(*) Notice: Subject to any disclaimer, the term of this patent is extended or adjusted under 35 U.S.C. 154(b) by 86 days.

(21) Appl. No.: 18/130,038

(22) Filed: Apr. 3, 2023

(65) Prior Publication Data

US 2024/0326217 A1 Oct. 3, 2024

(51) Int. Cl.

| | |
|---|---|
| ***B25D 17/06*** | (2006.01) |
| ***E02F 3/96*** | (2006.01) |
| ***E02F 9/22*** | (2006.01) |
| ***F15B 1/04*** | (2006.01) |
| ***F15B 11/08*** | (2006.01) |
| ***F15B 13/02*** | (2006.01) |
| ***F15B 15/00*** | (2006.01) |

(52) U.S. Cl.

CPC .............. *B25D 17/06* (2013.01); *E02F 3/966* (2013.01); *E02F 9/2217* (2013.01); *E02F 9/2225* (2013.01); *F15B 1/04* (2013.01); *F15B 11/08* (2013.01); *F15B 13/027* (2013.01); *F15B 15/00* (2013.01); *B25D 2217/0023* (2013.01); *E02F 9/2285* (2013.01)

(58) Field of Classification Search

CPC . B25D 17/06; B25D 2217/0023; E02F 3/966; E02F 9/2217; E02F 9/2225; E02F 9/2285; F15B 1/04; F15B 11/08; F15B 13/027; F15B 15/00

USPC ..... 173/1–2, 13, 18–20, 184, 29–31, 38–39, 173/45–53, 197, 81, 90, 140–141, 162.1, 173/198, 213, 168–171

See application file for complete search history.

(56) References Cited

U.S. PATENT DOCUMENTS 2,952,146 A * 9/1960 Bruck .................... B23D 47/12 464/10
3,403,600 A * 10/1968 Bade ....................... B25C 1/041 91/461
3,572,448 A * 3/1971 Marcenuk ................ B25D 9/08 173/207
3,741,527 A * 6/1973 Dahl ..................... F16D 43/218 254/350
4,179,983 A 12/1979 Wallace
4,347,902 A * 9/1982 Wallace ................ B25B 21/026 173/93.5
4,401,251 A * 8/1983 Nikolich ................ B25C 1/047 227/156

(Continued)

FOREIGN PATENT DOCUMENTS

CN 106703105 8 12/2018
CN 110307252 B 8/2020

(Continued)

OTHER PUBLICATIONS

Written Opinion and International Search Report for Int'l. Patent Appln. No.PCT/US2024/018461, mailed Jun. 21, 2024 (14 pgs).

*Primary Examiner* — Robert F Long

(57) ABSTRACT

A piston for a hydraulic hammer of a work machine is disclosed. The piston comprises a first portion having a first diameter, a second portion having a second diameter larger than the first diameter, the second portion having a plurality of grooves, and a third portion having a third diameter less than the second diameter.

12 Claims, 10 Drawing Sheets

(56) References Cited

U.S. PATENT DOCUMENTS

| | | | | | |
|---|---|---|---|---|---|
| 4,522,270 | A * | 6/1985 | Kishi | B23B 45/001 74/543 |
| 4,658,913 | A * | 4/1987 | Yantsen | B25D 9/12 173/208 |
| 4,910,443 | A * | 3/1990 | Zylstra | H02P 7/04 318/285 |
| 4,921,083 | A * | 5/1990 | Etscheidt | H02P 7/04 192/56.6 |
| 4,951,757 | A | 8/1990 | Hamada et al. | |
| 5,322,136 | A * | 6/1994 | Bui | E21B 4/14 173/110 |
| 5,700,214 | A * | 12/1997 | Kuznets | F16H 7/0848 474/110 |
| RE36,166 | E * | 3/1999 | Johns | E21B 4/16 173/17 |
| 6,196,332 | B1 * | 3/2001 | Albert | B25B 21/00 173/217 |
| 6,830,017 | B2 * | 12/2004 | Wolf | B25C 1/08 123/46 R |
| 7,152,692 | B2 | 12/2006 | Hurskainen et al. | |
| 7,578,161 | B1 * | 8/2009 | Sizemore | B21D 41/021 72/370.11 |
| 8,011,443 | B2 * | 9/2011 | Meixner | B25D 11/125 173/202 |
| 9,314,855 | B2 * | 4/2016 | Ookubo | H02P 23/03 |
| 9,840,000 | B2 * | 12/2017 | Juvonen | B25D 9/26 |
| 10,112,291 | B2 * | 10/2018 | Tang | F16B 35/048 |
| 2003/0029898 | A1 * | 2/2003 | Rosenbaum | B25C 1/08 227/9 |
| 2006/0061048 | A1 * | 3/2006 | Puzio | B23B 31/1253 279/60 |
| 2007/0251710 | A1 * | 11/2007 | Lim | E21B 4/14 173/109 |
| 2010/0326688 | A1 * | 12/2010 | Ullrich | B25D 17/06 173/210 |
| 2011/0198381 | A1 * | 8/2011 | McCardle | B25C 1/06 227/8 |
| 2011/0303464 | A1 * | 12/2011 | Mulligan | E21B 4/14 175/296 |
| 2012/0118597 | A1 * | 5/2012 | Hauptmann | B25D 17/06 173/126 |
| 2013/0319712 | A1 * | 12/2013 | Massler | B25D 17/06 173/201 |
| 2014/0262406 | A1 * | 9/2014 | Moore | B25D 9/20 173/208 |
| 2015/0097016 | A1 * | 4/2015 | Masas | B25C 1/163 227/9 |
| 2016/0176033 | A1 | 6/2016 | Juvonen et al. | |
| 2016/0221171 | A1 * | 8/2016 | Neathery | B25D 9/16 |
| 2017/0113337 | A1 * | 4/2017 | Dostinov | F15B 11/08 |
| 2018/0163366 | A1 * | 6/2018 | Park | E02F 3/966 |
| 2020/0001440 | A1 * | 1/2020 | Lee | B25B 21/002 |
| 2020/0078918 | A1 * | 3/2020 | Yoshikane | B25F 5/026 |
| 2020/0223048 | A1 * | 7/2020 | Ruethers | B25D 11/005 |
| 2020/0306947 | A1 * | 10/2020 | Lee | B25D 17/08 |
| 2021/0114195 | A1 * | 4/2021 | Yoshikane | B25D 11/10 |
| 2021/0146520 | A1 * | 5/2021 | Heep | B25D 11/125 |
| 2023/0122029 | A1 * | 4/2023 | Bierdeman | B25C 1/047 227/130 |
| 2023/0294260 | A1 * | 9/2023 | Koskimaki | B25D 9/12 173/1 |

FOREIGN PATENT DOCUMENTS

| | | | |
|---|---|---|---|
| CN | 211421210 | U | 9/2020 |
| CN | 112983927 | A | 6/2021 |
| CN | 215762537 | U | 2/2022 |

* cited by examiner

HAMMER PISTON

TECHNICAL FIELD

The present disclosure generally relates to a hammer assembly for a work machine, and more particularly relates to a piston of a hammer assembly.

BACKGROUND

Work machines such as excavators, backhoes, skid steers, wheel loaders, tractors, etc., are provided with a hammer assembly tool to demolish rock, concrete, earth material, or the like. Such hammer tools may be hydraulically powered utilizing a hydraulic circuit supplied with a hydraulic fluid to operate the hammer assembly. Generally, hydraulic hammers include a piston or hammer that provides reciprocating motion that strikes a tool to demolishes rock, earth, concreate, or other material. The reciprocating piston may be driven by high pressure fluid from the hydraulic circuit system. The force of the reciprocating piston may be transferred to the material to be demolished when the piston strikes the work tool.

The pistons in hydraulic hammers used with work machines are critical components that undergo significant stress and strain during the hammering operation. One of the major issues is the effect of surface area and contact pressure of the piston on mating parts, which can lead to an increase in galling or damage to the piston. The high velocity and pressure of hydraulic fluid during piston strokes in the hammer can cause erosion to the piston, leading to reduced performance and shorter piston life. Grooves provided on the piston that connect different hydraulic passages can also become clogged or obstructed, reducing the flow of fluid and leading to increased pressure in the system shortening the life of the piston.

Others have disclosed pistons for hydraulic hammer assemblies, but fail to provide a piston with sufficiently long use life. For example, U.S. Pat. No. 4,951,757 ("'757 Patent") discloses a hydraulic breaker having a piston with a five-staged configuration including a first, a second, a third, a fourth and a fifth stage sequentially disposed along an axial direction of the piston. The third stage has a smaller diameter than the fourth stage, and the third stage has six flats notched in the outer peripheral surface that allow for hydraulic fluid to pass within the cylinder of the hammer assembly.

It can therefore be seen that a need exists for an improved piston design for a hydraulic hammer operations that reduces galling and damage to the piston and increases the longevity and useful life of the piston.

SUMMARY OF THE DISCLOSURE

In accordance with one aspect of the disclosure, a piston for a hydraulic hammer of a work machine is disclosed. The piston comprises a first portion having a first diameter, a second portion having a second diameter larger than the first diameter, the second portion having a plurality of grooves, and a third portion having a third diameter less than the second diameter.

In accordance with another aspect of the disclosure, a hammer assembly for use with a work machine is disclosed herein. The hammer assembly comprises a cylinder, a piston reciprocally mounted within the cylinder, and a hammer tool coupled to the piston. The piston includes a first portion having a first diameter, a second portion having a second diameter larger than the first diameter, the second portion having a plurality of grooves, and a third portion having a third diameter less than the second diameter.

In accordance with another aspect of the disclosure, a method of fabricating a piston for a hammer assembly of a work machine is disclosed. The method comprises providing the piston as a metal bar; machining the piston to include a first portion, a second portion, and a third portion whereby the first portion has a first diameter, the second portion has a second diameter larger than the first diameter, and the third portion has a third diameter less than the second diameter; and machining the second portion to include a plurality of grooves on the second portion.

These and other aspects and features of the present disclosure will be better understood upon reading the following detailed description when read in conjunction with the accompanying drawings.

Figure 1:
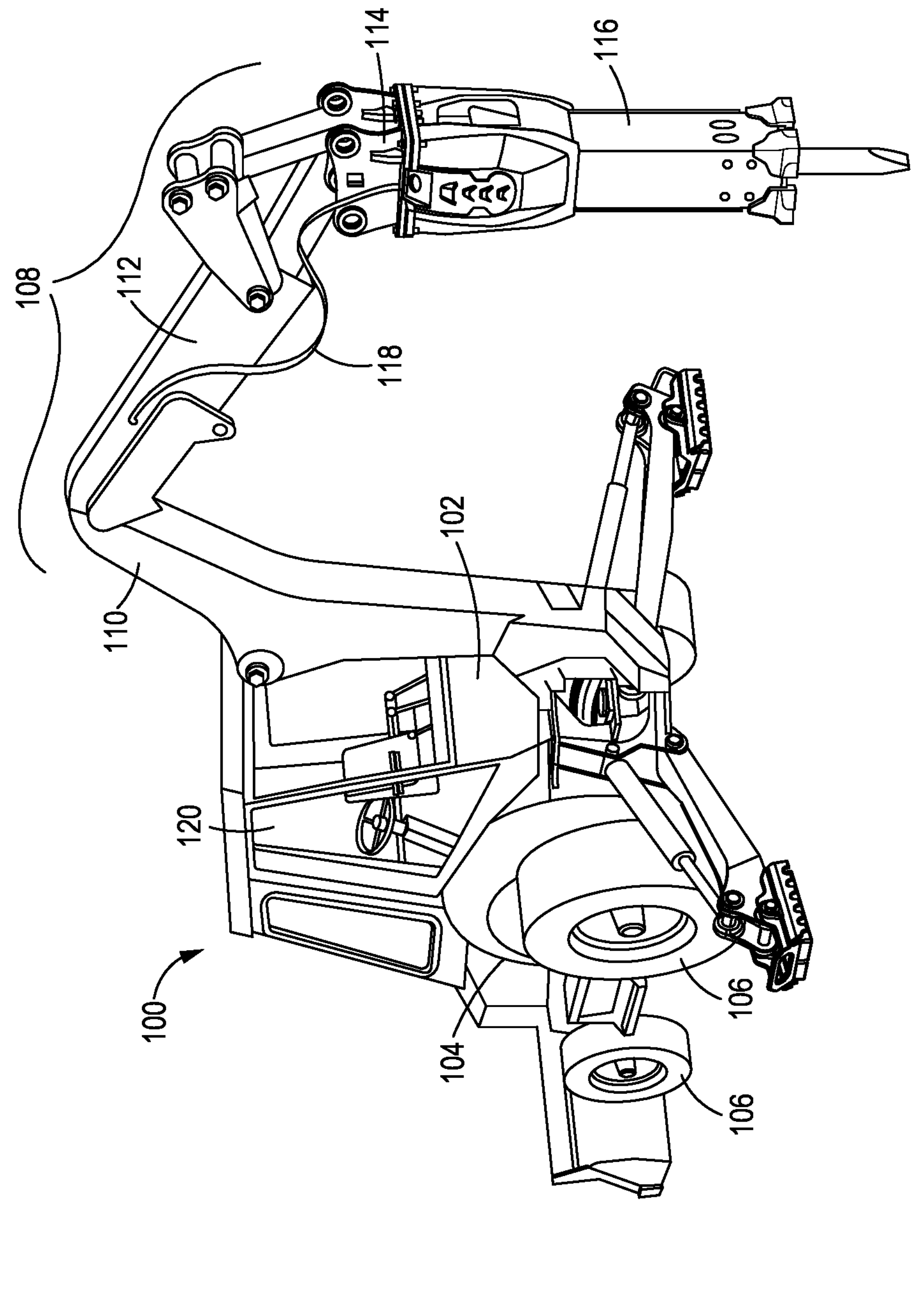
FIG. 1 is a perspective view of a work machine including a hammer assembly, according to an embodiment of the present disclosure.

The figures depict one embodiment of the presented invention for purposes of illustration only. One skilled in the art will readily recognize from the following discussion that alternative embodiments of the structures and methods illustrated herein may be employed without departing from the principles described herein.

DETAILED DESCRIPTION

Referring now to the drawings, and with specific reference to in the depicted example, an exemplary work machine 100 is shown, and illustrated as a backhoe loader. Backhoe loaders are heavy equipment designed to move earth material from the ground or landscape at a dig site in the construction and agricultural industries. While the following detailed description describes an exemplary aspect in connection with the backhoe loader, it should be appreciated that the description applies equally to the use of the present disclosure in other work machines including but not limited to excavators, front-end loaders, skid steers, wheel loaders, and tractors, as well.

Referring to FIG. 1, the work machine 100 includes a frame 102 supporting an engine 104. The frame 102 is supported on ground engaging elements 106, illustrated as wheels. It should be contemplated that the ground engaging elements 106 may be any other type of ground engaging elements 106 such as, for example, continuous tracks, etc. The work machine 100 further includes a working mechanism 108 extending from the frame for conducting work, such as, for example, demolishing landscapes, earth, concrete, rock, or other material at a dig site. The frame 102 may be an upper swiveling body common with excavators and work machines in the agricultural, construction, and mining industries. The working mechanism 108 includes a boom 110, an arm 112, a bracket 114, and a hammer assembly 116. The hammer assembly 116 may attach to the working mechanism 108 via the bracket 114. It may be recognized that the hammer assembly 116 may also attach to the working mechanism 108 via a coupler, quick coupler, or hydraulic quick coupler as generally known in the arts.

The hammer assembly 116 may be hydraulically actuated and connected to one or more hydraulic supply lines 118 via a hydraulic work machine circuit (not shown) provided with the work machine 100. The hydraulic work machine circuit may raise, lower, and/or swing the arm 112 and boom 110 to correspondingly raise, lower, and/or swing the hammer assembly 116. The work machine 100 may include a pump (not shown) connected to the hydraulic work machine circuit and to the hammer assembly 116 through the one or more hydraulic supply lines 118. The hydraulic work machine circuit may introduce pressurized fluid, for example oil, from the pump and into the one or more hydraulic supply lines 118 cylinders and to the hammer assembly 116. Operator controls for movement and actuating the hydraulic work machine circuit and/or the hammer assembly 116 may be located within a cab 120 of the work machine 100.

Figure 2:
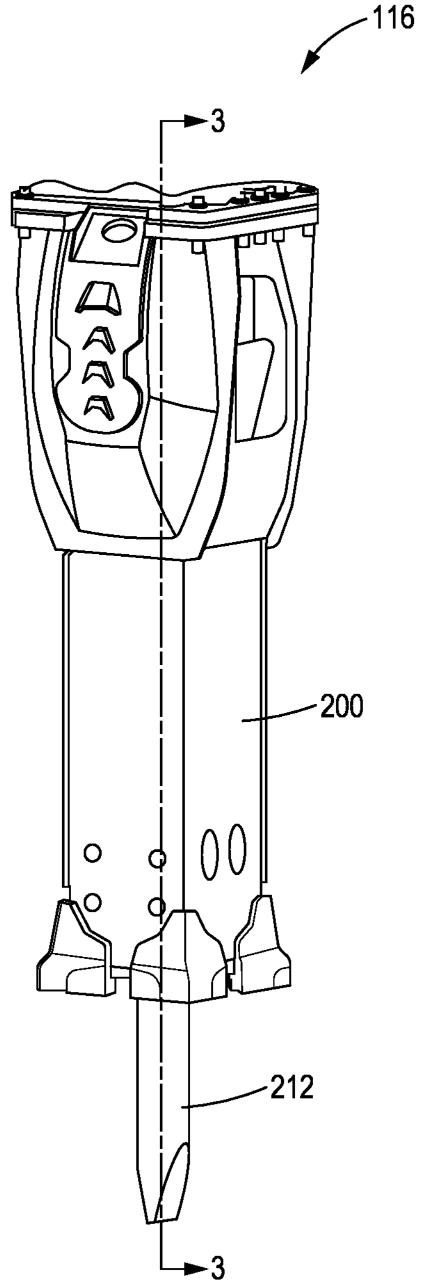
FIG. 2 is a side view of the hammer assembly of FIG. 1, according to an embodiment of the disclosure.

Referring now to FIG. 2, a side view of the hammer assembly 116 is illustrated. The hammer assembly 116 may include a hammer housing 200 and a hammer tool 212. A portion of the hammer tool 212 is coupled to the hammer housing 200. The hammer tool 212 may have a portion assembled within the hammer housing and a portion protruding out of an end of the hammer housing 200 to demolish rock, earth, concreate, or other material, as generally known in the arts.

Figure 3:
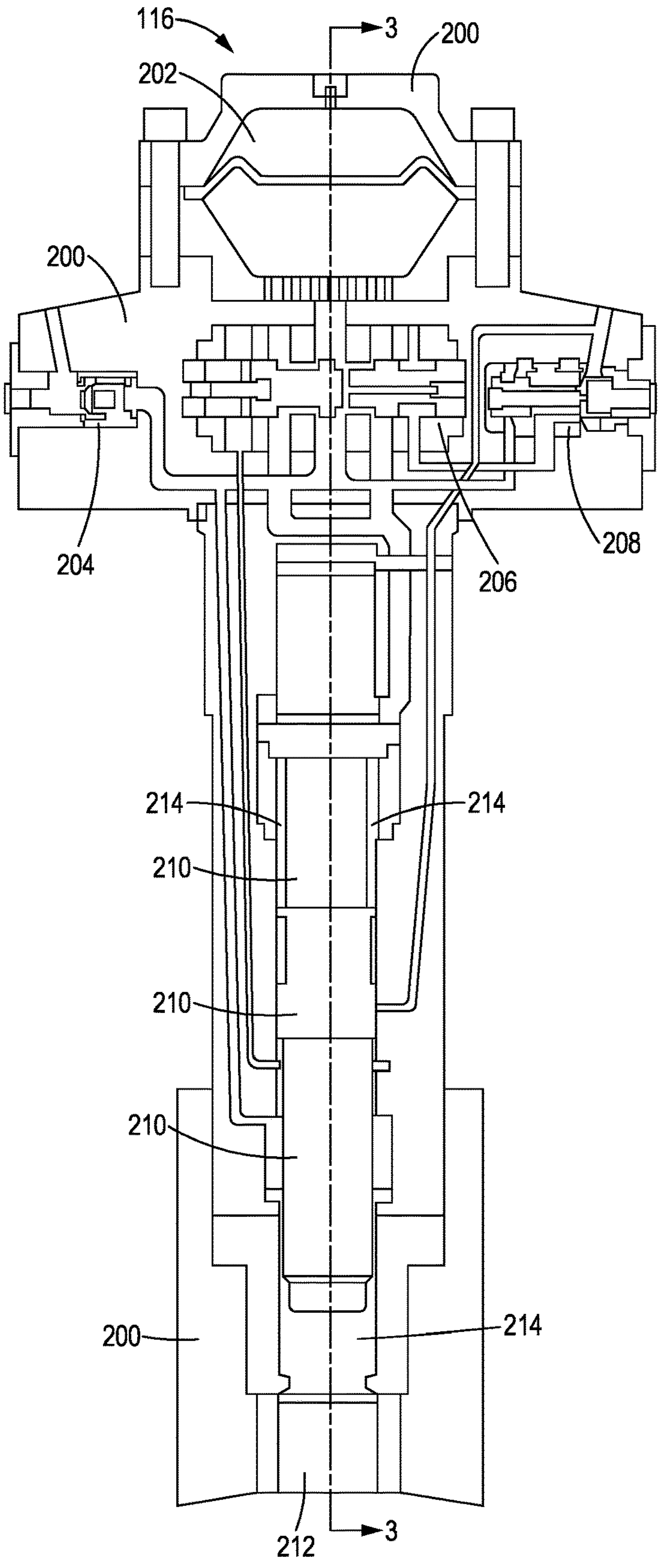
FIG. 3 is a cross-sectional view of the hammer assembly of FIG. 1 taken along line 3-3 of FIG. 2, according to an embodiment of the present disclosure.

Referring now to FIG. 3, a cross-sectional view of the hammer assembly 116 taken along line 3-3 of FIG. 2 is illustrated. The hammer assembly 116 may include the hammer housing 200, an accumulator 202, a check valve 204, a spool valve 206, a pressure control valve 208, a piston 210, and a hammer tool 212. The piston 210 is reciprocally coupled to the hammer tool 212 within a cylinder 214 in the hammer housing 200. The hammer tool 212 extends outside the hammer housing 200, opposite the bracket 114, for contacting and/or demolishing rock, dirt, earth, ground, and the like, when the piston 210 strikes the hammer tool 212 during operation of the hammer assembly 116. The pressure control valve 208 may be provided in the hammer assembly 116 to maintain maximum hydraulic pressure to ensure the hammer assembly 116 delivers all blows to demolish rock and the like at full power when the piston 210 strikes the hammer tool 212 during operation of the hammer assembly 116.

Figure 4:
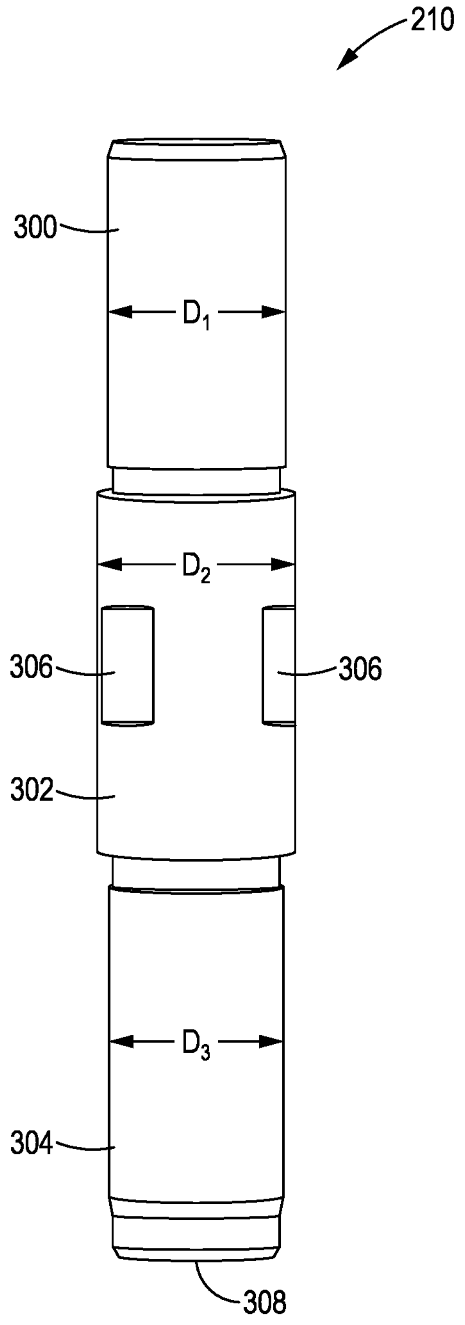
FIG. 4 is a perspective view of a piston used with the hammer assembly of FIG. 2, according to an embodiment of the present disclosure.

FIG. 4 depicts a perspective view of the piston 210 of the hammer assembly 116, according to one embodiment of the disclosure. The piston 210 includes a first portion 300 having a first diameter $D_1$, a second portion 302 having a second diameter $D_2$, and a third portion 304 having a third diameter $D_3$, a plurality of grooves 306 on the surface of the second portion 302, and a striking end 308 that reciprocally strikes against the hammer tool 212. The piston 210 may be a hammer or another piston type that provides a reciprocating impact motion to the hammer tool 212, as generally known in the arts.

The piston 210 and the hammer tool 212 are situated in the cylinder 214 within the hammer housing 200. The piston 210 reciprocally strikes against the hammer tool 212 within the cylinder 214. As the piston 210 repeatedly strikes the hammer tool 212 in the cylinder 214, the surface of the second portion 302 of the piston 210 may interact with the surface of the cylinder 214 causing surface wear and galling to the piston 210.

The second diameter $D_2$ of the piston 210 is designed to be larger than both the first diameter $D_1$ and the third diameter $D_3$ so that the second portion 302 interacts with the cylinder 214 during operation of the hammer assembly 116. The second diameter $D_2$ may further include three timing grooves in the plurality of grooves 306 to reduce the surface area of the second portion 302. The depth of the plurality of grooves 306 create hydraulic passages for hydraulic fluid, such as oil, to flow between the second portion 302 and the surface of the cylinder 214. The third diameter $D_3$ of the piston 210 may be smaller than the second diameter $D_2$ but greater than the first diameter $D_1$, while the second diameter $D_3$ $D_2$ remains larger than the first diameter $D_1$ and the third diameter $D_3$.

The plurality of grooves 306 may be machined onto the second portion 302 in a range of 3-10 mm depth into the second portion 302. One may recognize that the machining depths may be increased or decreased when forming the plurality of grooves onto the surface of the second portion 302. The added surface area provided to the piston 210 in the second portion 302 having the largest diameter, the second diameter $D_2$, reduces contact pressure and the likelihood of galling or damage to the piston 210 when the piston 210 repeatedly contacts the cylinder 214 during the reciprocal operation within the cylinder 214 of the hammer assembly 116. The depth of the plurality of grooves 306 creates hydraulic passages for hydraulic fluid to circulate within the cylinder 214.

The plurality of grooves 306 are positioned on the second portion 302 at various positions to allow for hydraulic fluid to pass through the hydraulic passages when the piston 210 is in certain positions within the cylinder 214 as the piston 210 moves in a reciprocating impact motion against the hammer tool 212. For example, when the piston 210 is at the highest position in the cylinder 214, hydraulic fluid may circulate through the hydraulic passages formed by three timing grooves on the second portion 302, but hydraulic fluid may not circulate when the piston 210 is in the center of the cylinder 214. The plurality of grooves 306 may be referred to as "timing grooves" for being positioned on the second portion 302 to time the circulation of hydraulic fluid at certain positions within the cylinder 214.

Figure 6:
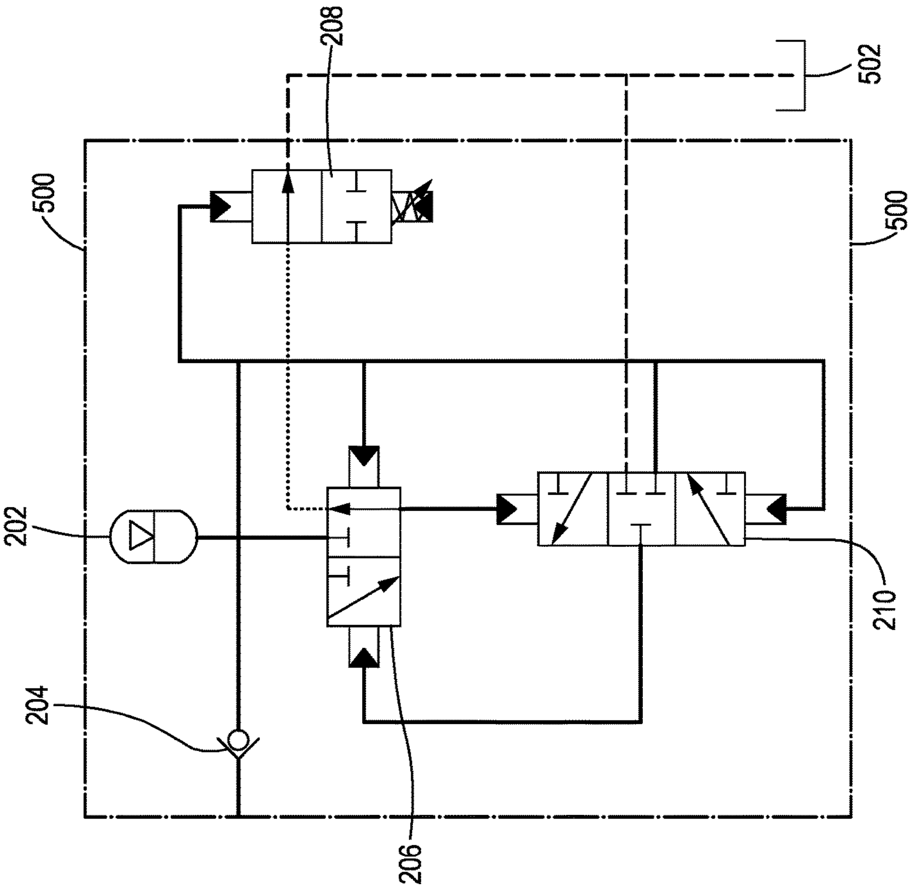
FIG. 6 is a flow diagram of a hydraulic circuit of the hammer assembly of FIG. 5 in a fixed blow energy cycle, according to an embodiment of the present disclosure.
Figure 5:
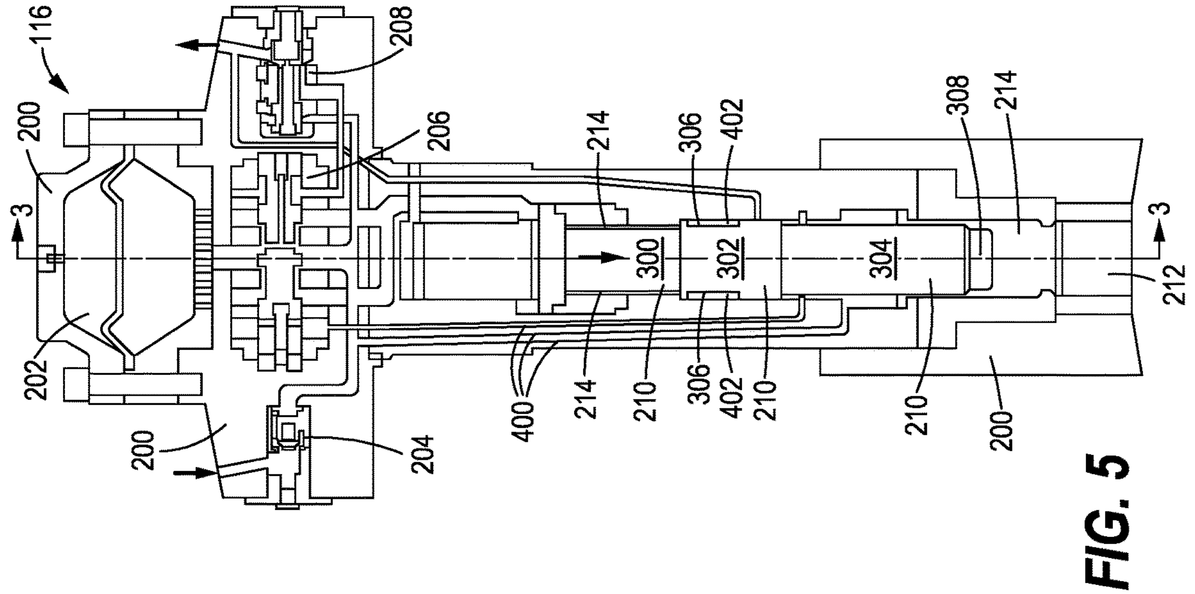
FIG. 5 is a cross-sectional view of the hammer assembly taken along line 3-3 of FIG. 2 in a fixed blow energy cycle, according to an embodiment of the present disclosure.

FIG. 5 illustrates a cross-sectional view of the hammer assembly 116 taken along line 3-3 of FIG. 2 in a fixed blow energy cycle, in one embodiment of the disclosure. FIG. 6 illustrates a hydraulic circuit of the hammer assembly 116 of FIG. 5 for fixed blow energy cycles during operation of the piston 210 in the hammer assembly 116, in one embodiment of the disclosure. The hydraulic work machine circuit in the work machine 100 may be operatively connected to hydraulic hammer lines 400 in the hammer assembly 116 which may provide pressurized fluid to cause the piston 210 to alternately reciprocate in a work stroke and return stroke pattern, as generally known in the arts. Operator controls for movement of the working mechanism 108 and/or the hammer assembly 116 may be located within a cab 120 of the work machine 100. Driven by a hydraulic supply, the piston 210 inside the hammer housing 200 may provide a reciprocating impact motion to the hammer tool 212, which, in turn, may be applied to a material, such as rock or concrete, in contact with the hammer tool 212. It is contemplated that the hammer tool 212 may include any known tool capable of interacting with the piston 210 and the ground, rock, or other material. The hammer tool 212, or a portion thereof, may enter and exit the hammer housing 200 during operation, such as when the piston 210 provides the reciprocating impact motion to the hammer tool 212.

The hammer assembly 116 may operate under a fixed blow energy cycle using the hydraulic work machine circuit of the work machine 100 which connects to a hydraulic hammer circuit 500 in the hammer assembly 116. In this hydraulic hammer circuit 500, the pressure control valve 208 has a specific opening pressure for the return flow to a tank 502 in hydraulic work machine circuit in the work machine 100. A fixed operating pressure is used to control the sequence of the accumulator 202 pressure. This allows the energy of the hammer assembly 116 to be at a maximum before the piston 210 starts to move. The fixed blow energy cycle provides the force to move the piston 210. This cycle does not regulate the force that pushes or drives the piston 210 in a downward direction towards the hammer tool 212.

The hammer assembly 116 conducts a series of operating cycles that provides force to move the piston 210 in a reciprocal motion within in the cylinder 214. The operating cycles include a startup cycle, a lifting cycle, a firing cycle, and a return cycle. The plurality of grooves 306 are provided on the second portion 302 and may create hydraulic passages 402 for the hydraulic fluid supply to pass through the hydraulic hammer lines 400 during the various operating cycles of the hammer assembly 116. In one embodiment, three timing grooves are provided in the plurality of grooves 306 at predetermined positions on the second portion 302 of the piston 210 which will create hydraulic passages 402 at different locations inside the cylinder 214 that circulates the hydraulic fluid at different times when the piston 210 reciprocally moves in the stroke and return stroke pattern within the cylinder 214.

Figure 8:
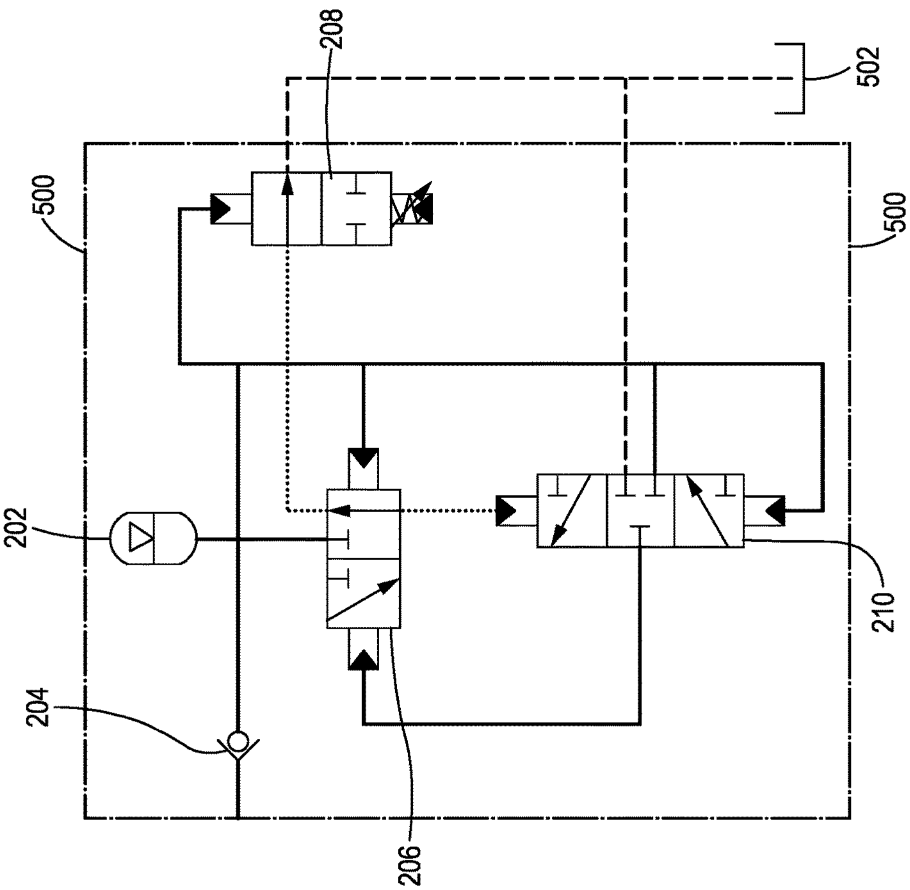
FIG. 8 is a schematic diagram of a hydraulic circuit of the hammer assembly of FIG. 7 in a startup cycle, according to an embodiment of the present disclosure.
Figure 7:
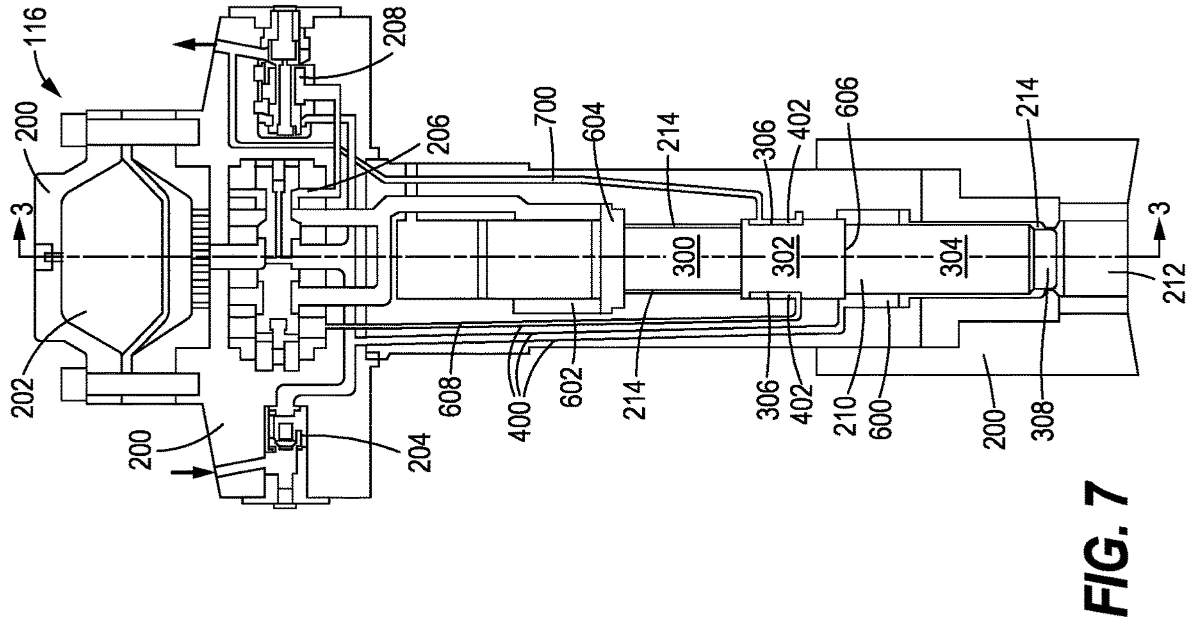
FIG. 7 is a cross-sectional view of the hammer assembly taken along line 3-3 in a startup cycle, according to an embodiment of the present disclosure.

FIG. 7 illustrates a cross-sectional view of the hammer assembly 116 taken along line 3-3 of FIG. 2 in a startup cycle, in another embodiment of the disclosure. FIG. 8 illustrates the hydraulic hammer circuit 500 of the hammer assembly 116 of FIG. 7 for the startup cycle of the piston 210 in the hammer assembly 116, in another embodiment of the disclosure. In the startup cycle, a hydraulic fluid supply from the hydraulic work machine circuit flows through check valve 204 and into both accumulator 202 and lifting area 600 near the bottom of the piston 210. A spring force may hold the pressure control valve 208 closed. This blocks the hydraulic fluid from flowing into a driving area 602 above the flange of the piston and prevents piston (5) from moving. The pressure in the hammer assembly 116 will increase and a gas, such as Nitrogen gas, compresses inside the accumulator 202.

Figure 10:
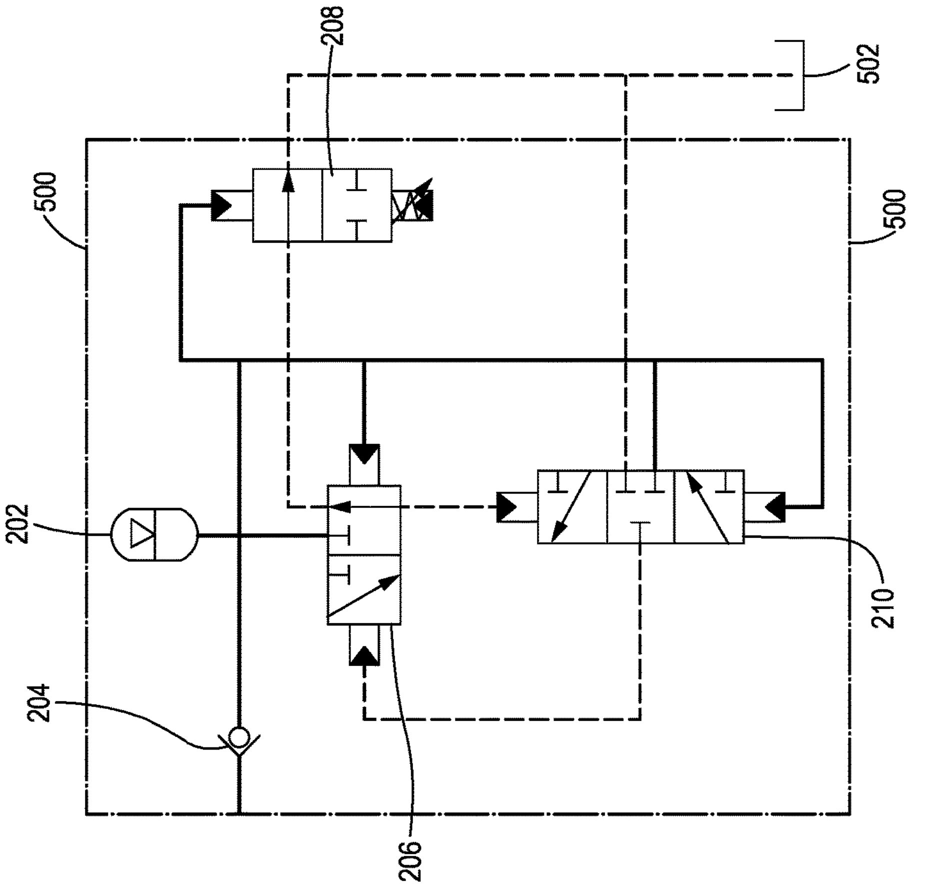
FIG. 10 is a schematic diagram of a hydraulic circuit of the hammer assembly of FIG. 9 in a lifting cycle, according to an embodiment of the present disclosure.
Figure 9:
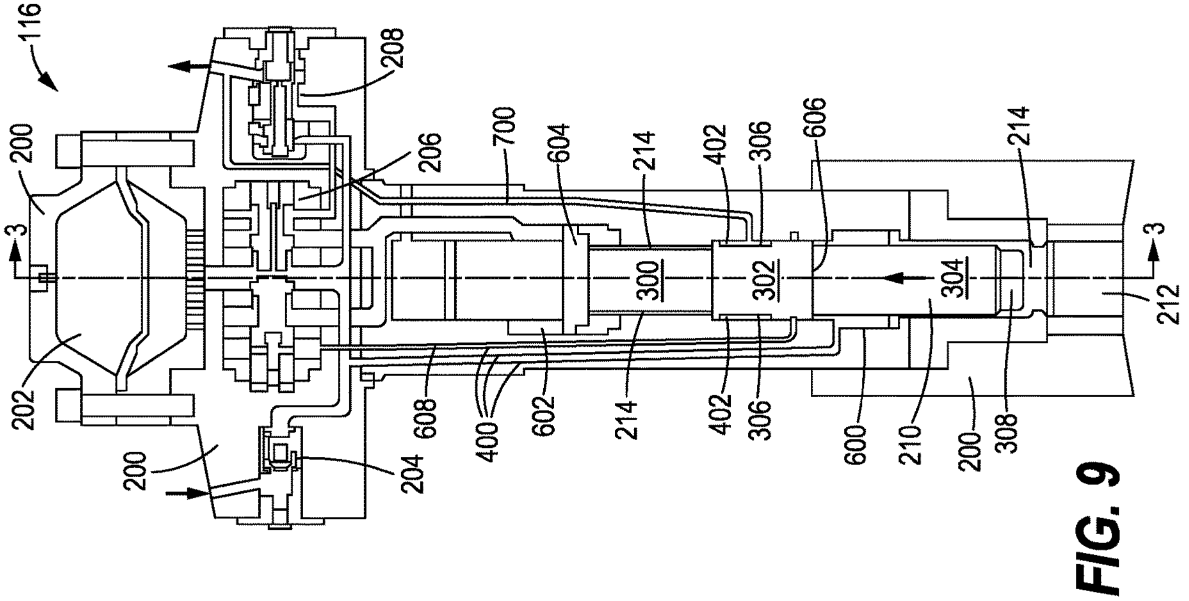
FIG. 9 is a cross-sectional view of the hammer assembly taken along line 3-3 in a lifting cycle, according to an embodiment of the present disclosure.

FIG. 9 illustrates a cross-sectional view of the hammer assembly 116 taken along line 3-3 of FIG. 2 in a lifting cycle, in another embodiment of the disclosure. FIG. 10 illustrates the hydraulic hammer circuit 500 of the hammer assembly 116 of FIG. 9 for the lifting cycle of the piston 210 in the hammer assembly 116, in another embodiment of the disclosure. During the lifting cycle, when a preset operating pressure threshold is reached and the accumulator 202 is charged, the pressure control valve 208 opens. The pressure control valve 208 then directs hydraulic fluid from the driving area 602 above an upper flange 604 of piston 210 to the tank 502 in the work machine 100. The piston 210 starts to move upward due to high fluid pressure at the bottom of the lower flange 606 of the piston 210. The upper flange 604 of the piston 210 forces the hydraulic fluid from the driving area 602 to the tank 502 in the work machine 100.

Figure 12:
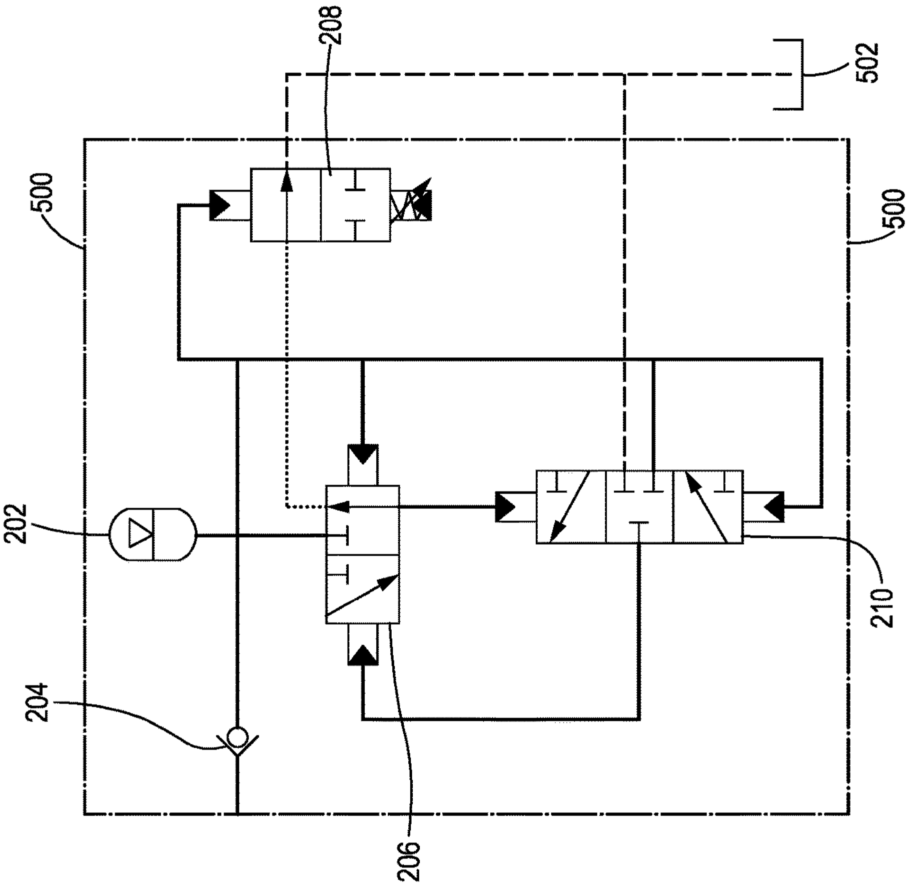
FIG. 12 is a schematic diagram of a hydraulic circuit of the hammer assembly of FIG. 11 in a firing cycle, according to an embodiment of the present disclosure.
Figure 11:
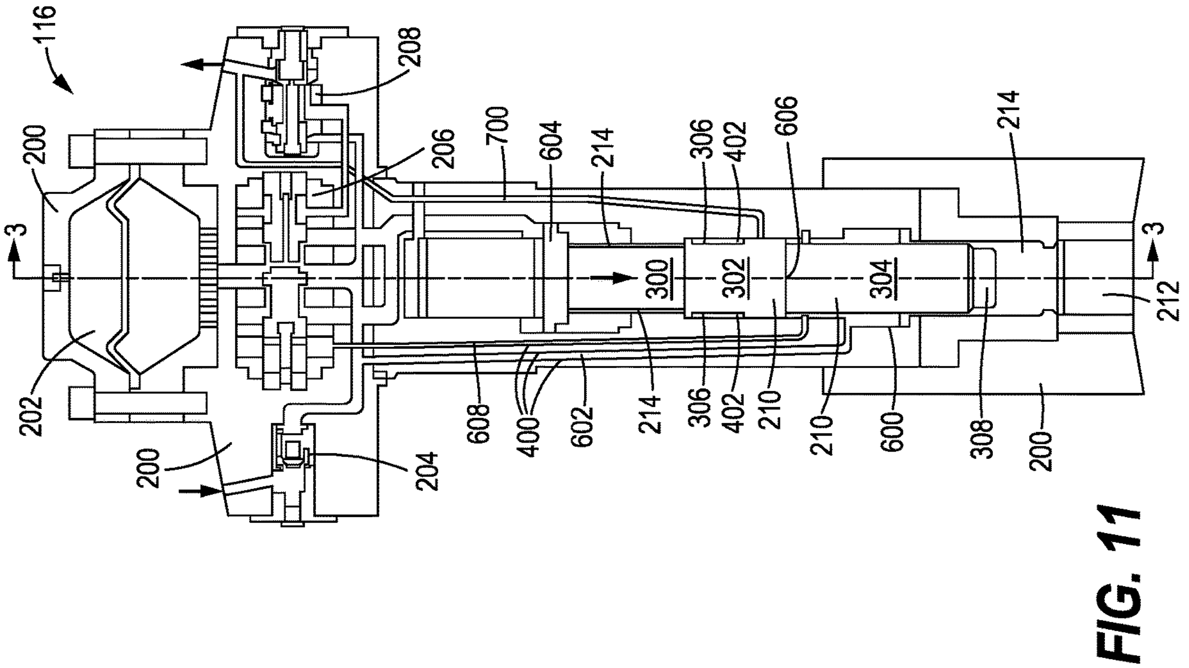
FIG. 11 is a cross-sectional view of the hammer assembly taken along line 3-3 in a firing cycle, according to an embodiment of the present disclosure.

FIG. 11 illustrates a cross-sectional view of the hammer assembly 116 taken along line 3-3 of FIG. 2 in a firing cycle, in another embodiment of the disclosure. FIG. 12 illustrates the hydraulic hammer circuit 500 of the hammer assembly 116 of FIG. 11 for the firing cycle of the piston 210 in the hammer assembly 116, in another embodiment of the disclosure. In the firing cycle, when piston 210 is at the highest position, hydraulic fluid from lifting area 600 at the bottom of piston 210 is directed through pilot passage 608 to the left end of spool valve 206. The spool valve 206 then shifts to the right. This connects the accumulator 202 with the upper flange 604 of the piston 210 which supplies hydraulic fluid to the upper flange 604 of the piston 210. The upper flange 604 of the piston 210 is put under pressure actuating the piston 210 to start the downward impact stroke within the cylinder 214 towards the hammer tool 212.

Figure 14:
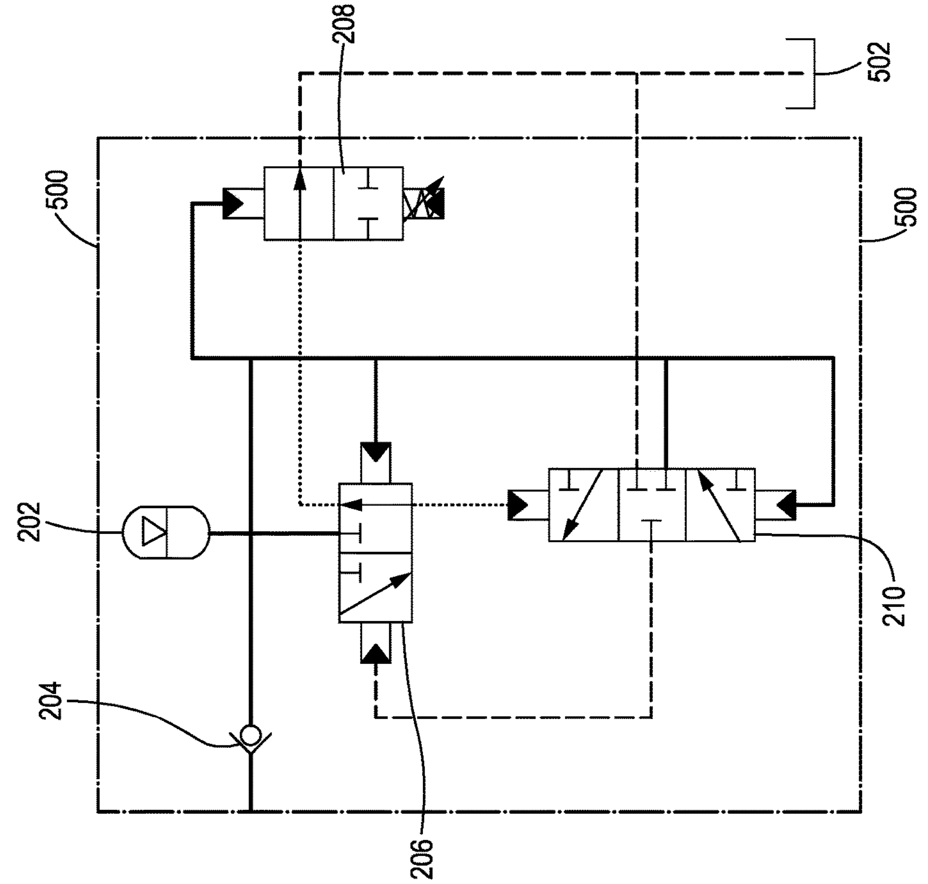
FIG. 14 is a schematic diagram of a hydraulic circuit of the hammer assembly of FIG. 13 in a return cycle, according to an embodiment of the present disclosure.
Figure 13:
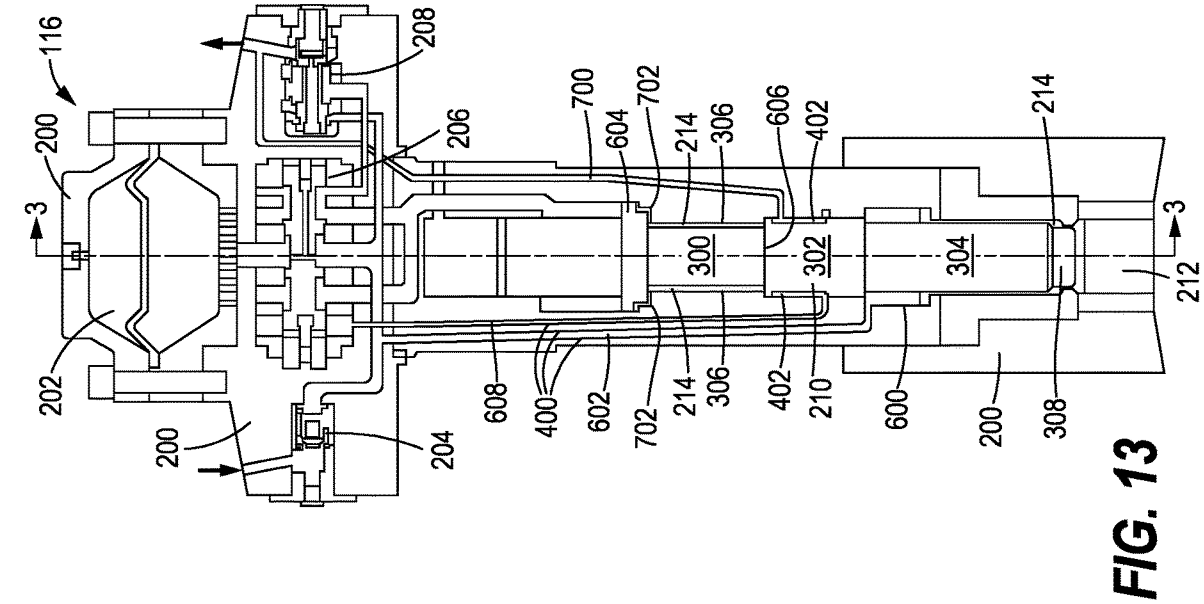
FIG. 13 is a cross-sectional view of the hammer assembly taken along line 3-3 in a return cycle, according to an embodiment of the present disclosure.
Figure 15:
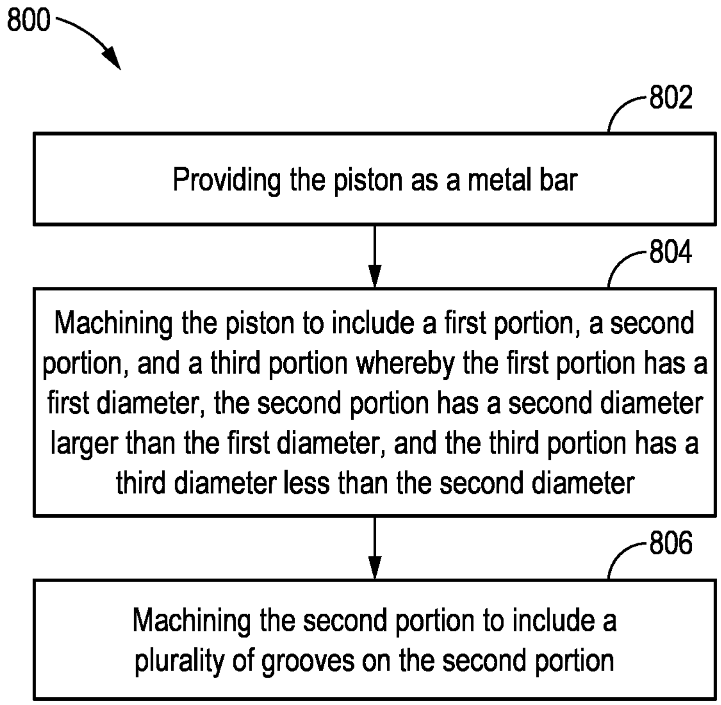
FIG. 15 is a flow-chart of a method for fabricating the piston of FIG. 4, according to an embodiment of the present disclosure.

FIG. 13 illustrates a cross-sectional view of the hammer assembly 116 taken along line 3-3 of FIG. 2 in a return cycle, in another embodiment of the disclosure. FIG. 14 illustrates the hydraulic hammer circuit 500 of the hammer assembly 116 of FIG. 13 for the return cycle of the piston 210 in the hammer assembly 116, in another embodiment of the disclosure. In the return cycle, the velocity of the piston 210 increases as the piston 210 moves downward. The operating pressure decreases during the impact stroke which causes the pressure control valve 208 to close pilot passage 608. When the piston 210 strikes the hammer tool 212, the hydraulic passages formed by the plurality of grooves 306 connects the pilot passage 608 to the tank line 700. This releases pressure on the left end of the spool valve 206. This allows the spool valve 206 to move back to the left. The hydraulic fluid below the upper flange 604 of the piston 210 may function as a hydraulic brake 702 on the piston 210. The hydraulic brake 702 protects the piston 210 and the cylinder 214 from idle strokes. The piston 210 is now returned to the start position and ready for the next cycle.

INDUSTRIAL APPLICABILITY

In operation, the present disclosure may find applicability in many industries including, but not limited to, the construction, earth-moving, mining, and agricultural industries. Specifically, the technology of the present disclosure may be used to demolish a variety of materials such as rock, concrete, asphalt, or other earth materials used with a variety of work machines including, but not limited to, excavators, backhoes, skid steers, wheel loaders, tractors, and the like. While the foregoing detailed description is made with specific reference to hammer assemblies of work machines, it is to be understood that its teachings may also be applied onto the other hammer assemblies utilizing pistons such as concrete breaking tools, hammer breakers, and the like.

Referring now to FIG. 14, a method 800 of fabricating the piston 210 for the hammer assembly 116 of a work machine 100. In a first step 802, the piston is provided as a metal bar. In a step 804, the piston 210 is machined to include the first portion 300, the second portion 302, and the third portion 304 whereby the first portion 300 has the first diameter $D_1$, the second portion 302 has the second diameter $D_2$ larger than the first diameter $D_1$, and the third portion 304 has a third diameter $D_3$ less than the second diameter $D_2$. It may be recognized that the piston 210 may be initially provided as a steel metal bar or other material commonly used for pistons and hammers.

In a step 806, the second portion 302 is machined to include a plurality of grooves 306 on the surface of the second portion 302. For example, three timing grooves may be machined on the second portion 302 as the plurality of grooves 306. The three timing grooves may be rectangular and machined to a depth up to 10 mm. In some embodiments, the three timing grooves may have a depth of 5 mm, 6 mm, or 7 mm. The three timing grooves may be elongated to allow for elongated hydraulic passages to form within the cylinder 214. The piston 210 may be provided in the cylinder 214 of the hammer assembly 116 so that the piston repeatedly strikes the hammer tool 212 during operation in the hammer assembly 116.

From the foregoing, it can be seen that the technology disclosed herein has industrial applicability in a variety of settings such as, but not limited to work machines in the construction, mining, and agricultural industries that utilize a hammer assembly using a work tool for demolishing rock, earth, or other material.

What is claimed is:

1. A piston for a hydraulic hammer of a work machine, the piston comprising:

a first portion having a first diameter;

a second portion having a second diameter larger than the first diameter, the second portion having a plurality of grooves, each of the plurality of grooves has a depth of 3 mm to 10 mm; and a third portion having a third diameter less than the second diameter, and the third diameter of the piston is greater than the first diameter, wherein the third portion defines a striking end of the piston, wherein the second portion is between the first portion and the second portion, wherein the plurality of grooves consists of three timing grooves, and wherein an outer surface of the second portion is cylindrical and smooth and free of any surface features except for the three timing grooves.

2. The piston of claim 1, wherein the three timing grooves each have a length greater than a width, the length being oriented in a longitudinal direction of the piston.

3. The piston of claim 1, wherein the plurality of grooves are shaped rectangularly.

4. The piston of claim 1, wherein the piston is made of steel.

5. A hammer assembly for use with a work machine comprising:

a cylinder;

a piston reciprocally mounted within the cylinder including:

a first portion having a first diameter, a second portion having a second diameter larger than the first diameter, the second portion having a plurality of grooves, each of the plurality of grooves has a depth of 3 mm to 10 mm, and a third portion having a third diameter less than the second diameter, and the third diameter of the piston is greater than the first diameter; and a hammer tool coupled to the piston, wherein the third portion defines a striking end of the piston, wherein the second portion is between the first portion and the second portion, wherein an outer surface of the second portion is cylindrical and smooth and free of any surface features except for the plurality of grooves, and wherein all of the plurality of grooves are at a same height as each other in a longitudinal direction of the second portion and spaced from each other radially about an outer circumference of the second portion.

6. The hammer assembly of claim 5, operatively associated with:

an accumulator;

a check valve;

a valve spool; and a pressure valve.

7. The hammer assembly of claim 5 is a hydraulic hammer.

8. The hammer assembly of claim 5, wherein the plurality of grooves consists of three timing grooves.

9. The hammer assembly of claim 7, further comprising:

a hydraulic hammer circuit to provide a hydraulic fluid to a hydraulic lifting area proximate to the third portion of the piston to lift the piston away from the hammer tool, and the hydraulic hammer circuit provides the hydraulic fluid to a driving area proximate to the first portion of the piston to driving the piston against the hammer tool.

10. The hammer assembly of claim 5, wherein the plurality of grooves respectively form a plurality of hydraulic passages.

11. The hammer assembly of claim 5, wherein the plurality of grooves are shaped rectangularly.

12. The hammer assembly of claim 5, wherein the hammer assembly is coupled to a working mechanism of the work machine, the work machine including:

a frame;

a ground engaging element supporting the frame;

an engine of the work machine mounted in the frame;

the working mechanism extending from the frame; and a hydraulic circuit operable with the hammer assembly.

* * * * *